US012048657B2

(12) United States Patent
Brown et al.

(10) Patent No.: US 12,048,657 B2
(45) Date of Patent: Jul. 30, 2024

(54) MOBILITY CHAIRS AND RETENTION SYSTEMS FOR MOBILITY CHAIRS

(71) Applicant: ADAPTDEFY LIMITED, Christchurch (NZ)

(72) Inventors: Michael John Brown, Christchurch (NZ); Timothy Stephen Cox, Christchurch (NZ)

(73) Assignee: ADAPTDEFY LIMITED, Christchurch (NZ)

( * ) Notice: Subject to any disclaimer, the term of this patent is extended or adjusted under 35 U.S.C. 154(b) by 545 days.

(21) Appl. No.: 17/268,564

(22) PCT Filed: Aug. 19, 2019

(86) PCT No.: PCT/NZ2019/050102

§ 371 (c)(1),
(2) Date: Feb. 15, 2021

(87) PCT Pub. No.: WO2020/040648

PCT Pub. Date: Feb. 27, 2020

(65) Prior Publication Data

US 2021/0169717 A1 Jun. 10, 2021

(51) Int. Cl.
*A61G 5/10* (2006.01)

(52) U.S. Cl.
CPC .................................... *A61G 5/10* (2013.01)

(58) Field of Classification Search
CPC .......................... A61G 5/10; B60N 2002/2815
See application file for complete search history.

(56) References Cited

U.S. PATENT DOCUMENTS

| | | | | |
|---|---|---|---|---|
| 3,241,881 A * | 3/1966 | Rice | B60R 22/12 2/338 |
| 3,580,523 A | 5/1971 | Preston | |
| 5,280,657 A * | 1/1994 | Stagg | A61G 7/1026 5/81.1 R |
| 5,439,240 A | 8/1995 | Tichenor et al. | |
| 5,492,285 A | 2/1996 | Hamrick | |

(Continued)

FOREIGN PATENT DOCUMENTS

| | | |
|---|---|---|
| CA | 2682283 | 5/2011 |
| CN | 106821626 A * | 6/2017 |

(Continued)

OTHER PUBLICATIONS

International Search Report and Written Opinion issued in PCT/NZ2019/050102 dated Nov. 21, 2019 (12 pages).

(Continued)

*Primary Examiner* — Timothy J Brindley
(74) *Attorney, Agent, or Firm* — ARC IP Law, PC; Joseph J. Mayo

(57) ABSTRACT

The invention relates to retention systems for retaining items during use of a mobility chair. According to one embodiment, a mobility chair includes a frame, wheels and a seat; and an item retention system including one or more retractable straps such that when, in use, a user is positioned on the seat, the one or more retractable straps are arranged to be extended and secured to retain one or more items positioned on the user's lap or on the seat in front of the user. A related method of retaining an item or items on the user's lap is also described.

25 Claims, 12 Drawing Sheets

(56) References Cited

U.S. PATENT DOCUMENTS

| | | | | |
|---|---|---|---|---|
| 6,439,494 | B1 | 8/2002 | Specht et al. | |
| 7,334,712 | B2 | 2/2008 | Hassett et al. | |
| 9,016,608 | B2 * | 4/2015 | Bradley | B60R 22/36 242/385.4 |
| 10,918,539 | B1 * | 2/2021 | Reyes | A61G 1/044 |
| 2005/0173888 | A1 * | 8/2005 | Stamps | A61G 5/10 280/250.1 |
| 2005/0189803 | A1 * | 9/2005 | Kasten | A61G 5/10 297/219.1 |
| 2006/0097562 | A1 | 5/2006 | Hiruta et al. | |
| 2009/0173354 | A1 | 7/2009 | Gold | |
| 2009/0315385 | A1 * | 12/2009 | Shickle | A61G 5/10 297/468 |
| 2012/0151679 | A1 * | 6/2012 | Kenalty | A61G 1/013 5/628 |
| 2012/0326473 | A1 | 12/2012 | Salvan | |
| 2015/0320582 | A1 * | 11/2015 | Markovic | A61F 5/3769 128/876 |

FOREIGN PATENT DOCUMENTS

| | | | | |
|---|---|---|---|---|
| CN | 107320255 | A * | 11/2017 | A61G 5/08 |
| CN | 111658462 | A * | 9/2020 | A61G 5/00 |
| CN | 114569415 | A * | 6/2022 | |
| EP | 1666014 | | 7/2006 | |
| GB | 2494309 | A * | 3/2013 | A61G 5/00 |
| KR | 20160109192 | A * | 9/2016 | |
| WO | 2013/068710 | | 5/2013 | |
| WO | WO-2014152651 | A1 * | 9/2014 | A47C 7/36 |
| WO | WO-2017093830 | A1 * | 6/2017 | |

OTHER PUBLICATIONS

First Examination Report issued in NZ745582 dated Dec. 11, 2018 (5 pages).

Diyot, “Options for transporting food when using a power wheelchair”, Apr. 13, 2013, http://outreachtherapyconsultants.com/2013/04/13/options-for-transporting-food-when-using-a-power-wheelchair/.

* cited by examiner

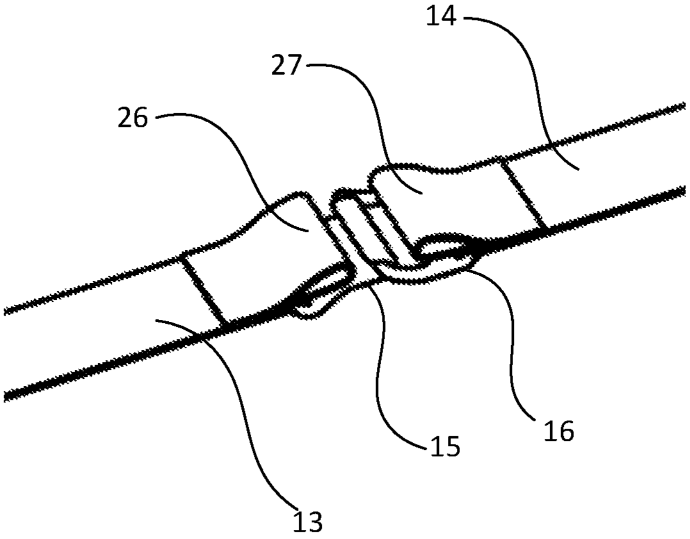
Figure 11
Figure 12
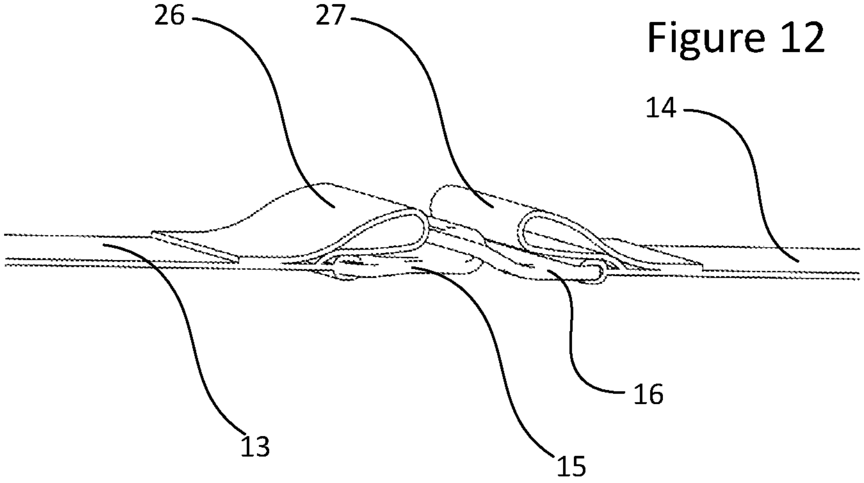

MOBILITY CHAIRS AND RETENTION SYSTEMS FOR MOBILITY CHAIRS

FIELD OF THE INVENTION

The invention relates to retention systems for retaining items during use of a mobility chair.

BACKGROUND

Wheelchair users often wish to carry items with them during movement of the wheelchair. For users of manual wheelchairs, items generally cannot be conveniently carried with the hands while simultaneously propelling the wheelchair.

Users of powered wheelchairs often use at least one hand to control movement of the wheelchair via a hand operated actuator. Some users of powered wheelchairs use other types of actuator (e.g. head-operated controllers). In any case, the user's hands may be unavailable for holding items during motion of the wheelchair.

A wheelchair user may place items on their lap to free up their hands for controlling and/or propelling the wheelchair. However, this leaves the items unsecured and prone to falling off and hence to damage. Propelling a manual wheelchair and trying to balance an item on the lap can also be frustrating and time consuming, especially if the item/s are large or odd shaped, or the terrain is uneven or inclined.

Items may be placed in a bag or the like, which may be hung on the wheelchair frame. However, bags may not be easily accessible to users. In an attempt to address this issue, EP1900350 proposes a retrieval system allowing a user to hang a backpack on the back of their wheelchair and subsequently to retrieve the backpack. This is a complex and unwieldy arrangement.

Similar problems may be encountered by users of mobility scooters or other seated mobility aids.

In this specification the term "mobility chair" includes any manual or powered mobility chair for use by a mobility-impaired user and including a seat and wheels.

Traditionally mobility chairs have generally had four wheels (often two larger main wheels and two smaller front wheels for wheelchairs, or four similarly sized wheels for mobility scooters). However, some more recent mobility chairs with suitable stability control may have a smaller number of wheels—e.g. the Ogo chair, which has one wheel on each side of the chair. The term "mobility chair" encompasses wheelchairs, mobility scooters and similar seated mobility aids, with any suitable number of wheels.

Relevant mobility impairments may include lower limb loss or disability from whatever cause, including injury, congenital conditions, acquired-with-age conditions, or health conditions.

It is an object of the invention to provide a system for retention of an item during use of a mobility chair and/or a mobility chair including such a system, or at least to provide the public with a useful choice.

SUMMARY

According to one embodiment, a mobility chair includes a frame, wheels and a seat; and an item retention system including one or more retractable straps such that when, in use, a user is positioned on the seat, the one or more retractable straps are arranged to be extended and secured to retain one or more items positioned on the user's lap or on the seat in front of the user.

According to further embodiment, a mobility chair may include: a frame, wheels and a seat; and an item retention system including one or more retractable straps and at least one holder, each holder being mounted on the mobility chair and holding one of the one or more straps in its retracted position such that when, in use, a user is positioned on the seat, the one or more retractable straps are arranged to be extended from the at least one holder, from at least one side of the seat upwards and secured over one or more items positioned on the user's lap or on the seat in front of the user to retain the one or more items.

The retractable straps may be biased to a retracted position. The retractable straps may be self-retracting, self-locking retractable straps.

The mobility chair may include one or more strap spools onto which the retractable straps are wound in a retracted position, the strap spools including a self-retracting, self-locking mechanism.

The mobility chair may include one or more strap housings in which the strap spools are mounted.

The mobility chair may include a mounting arrangement configured to mount the item retention system. The mounting arrangement may be configured to mount the item retention system to the frame. The mounting arrangement may include one or more brackets configured to mount to the frame.

The mobility chair may include one or more connectors arranged to secure the one or more straps in an extended position. The one or more connectors may include one or more buckles. Alternatively, the one or more connectors may include cooperating hook and loop connectors. Alternatively, the one or more connectors may include cooperating magnetic connectors and/or back pack buckles or other similar functioning members.

The mobility chair may include a connector retainer for each connector, the connector retainer configured to retain its respective connector within reach of a user when the strap is in a retracted position.

The connector and connector retainer may include cooperating magnetic elements.

The mobility chair may be a wheelchair. The mobility chair may be a manual wheelchair. Alternatively, the mobility chair may be an automatic wheelchair including a user-operated controller.

Alternatively, the mobility chair may be a mobility scooter.

In a further embodiment, a mobility chair item retention system may include a mounting arrangement configured to mount the item retention system to a mobility chair including a frame, wheels and a seat; and one or more retractable straps such that when, in use, a user is positioned on the seat of a mobility chair to which the item retention system is mounted, the one or more retractable straps are arranged to be extended and secured to retain one or more items positioned on the user's lap or on the seat in front of the user.

The retractable straps may be biased to a retracted position. The retractable straps may be self-retracting, self-locking retractable straps.

The mobility chair item retention system may include one or more strap spools onto which the retractable straps are wound in a retracted position, the strap spools including a self-retracting, self-locking mechanism.

The mobility chair item retention system may include one or more strap housings in which the strap spools are mounted.

The mobility chair item retention system may include a mounting arrangement configured to mount the item retention system to the mobility chair.

The mounting arrangement may be configured to mount the item retention system to the frame.

The mounting arrangement may include one or more brackets configured to mount to the frame.

The mobility chair item retention system may include one or more connectors arranged to secure the one or more straps in an extended position. The one or more connectors may include one or more buckles.

Alternatively, the one or more connectors may include cooperating hook and loop connectors.

Alternatively, the one or more connectors may include cooperating magnetic connectors.

The mobility chair item retention system may include a connector retainer for each connector, the connector retainer configured to retain its respective connector within reach of a user when the strap is in a retracted position.

The connector and connector retainer may include cooperating magnetic elements.

In another embodiment, a method of retaining an item positioned on the lap of a user of a mobility chair including a frame, wheels and a seat, may include: extending and securing one or more retractable straps over or around the item to retain the item on the user's lap or on the seat in front of the user.

BRIEF DESCRIPTION OF THE DRAWINGS

The invention will be described by way of example only, with reference to the accompanying drawings, in which:

FIG. 11 is an expanded perspective view of a buckle used to retain the retractable straps of FIG. 1 in an extended position;

FIG. 12 is another expanded perspective view, similar to FIG. 11;

DESCRIPTION OF PREFERRED EMBODIMENTS

Figure 1:
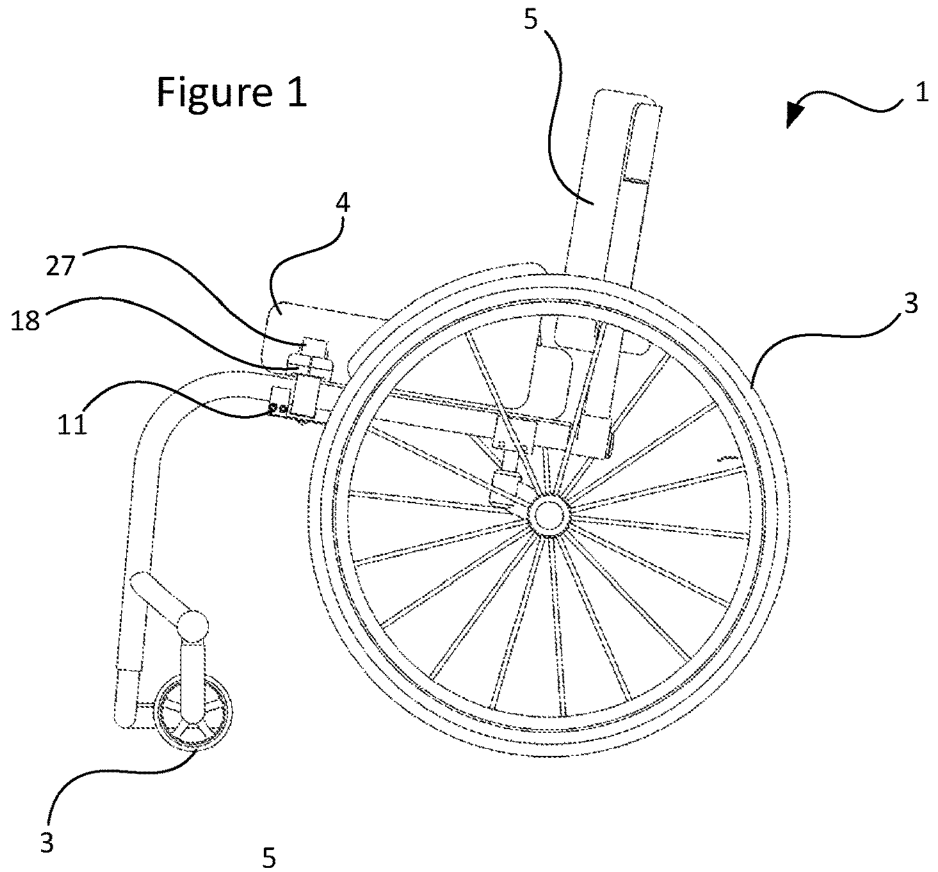
FIG. 1 is a left side view of a wheelchair including a retention system, according to one embodiment.
Figure 2:
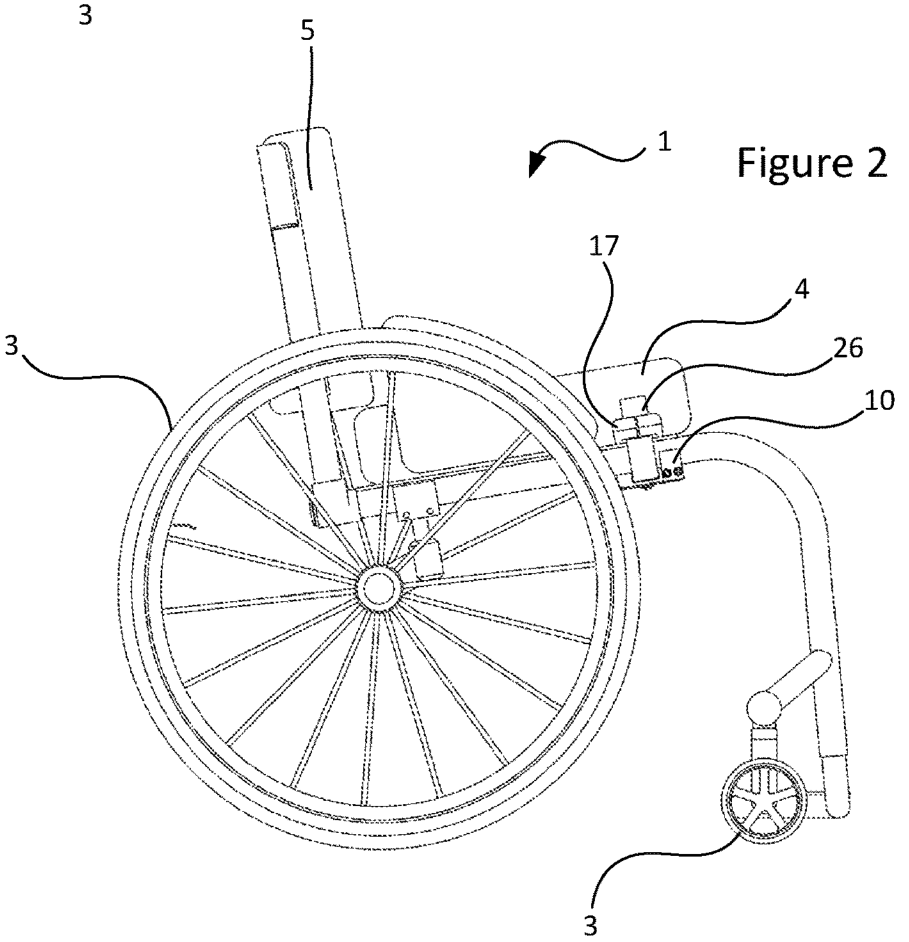
FIG. 2 is a right side view of the wheelchair of FIG. 1.
Figure 3:
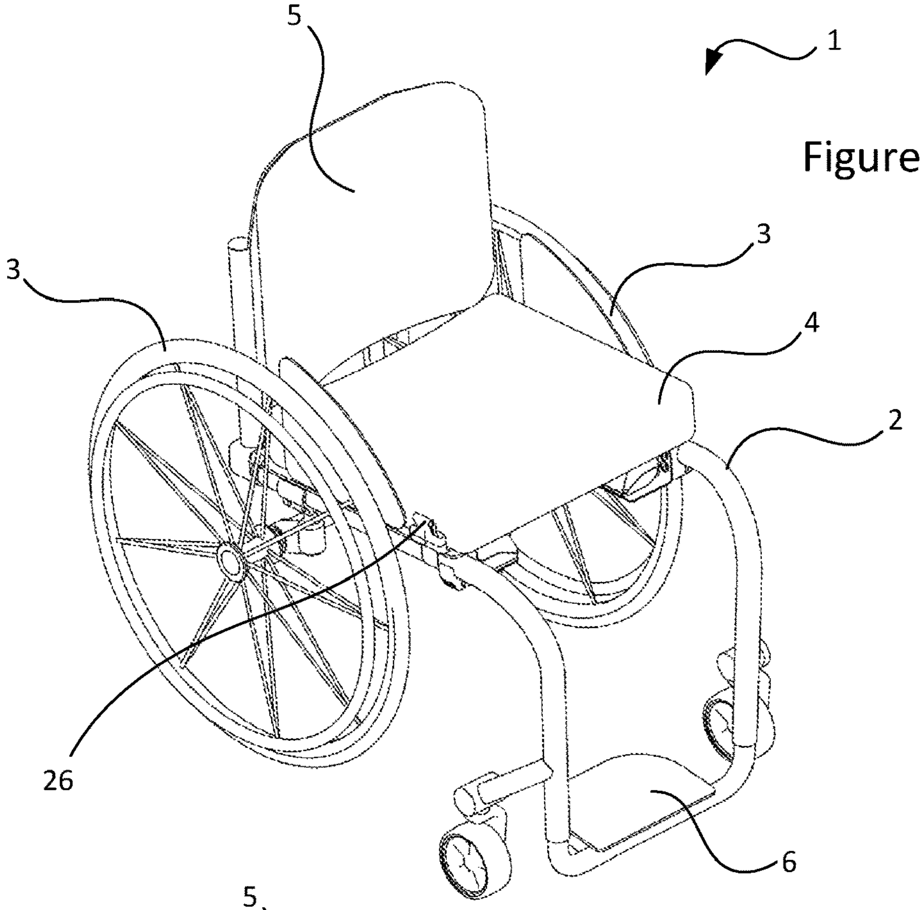
FIG. 3 is a top perspective view of the wheelchair of FIG. 1.

The Applicant's system enables a mobility chair user to retain one or more items on their lap (thigh area) so that their hands are free to control and/or propel the mobility chair while the one or more items are retained. Some mobility chair users may not have a lap (e.g. double amputees of the lower limbs), in which case one or more items may be retained on the seat in front of the user.

The Applicant's arrangement uses one or more retractable straps that are mounted to the mobility chair. The one or more straps may be mounted to a frame of the mobility chair, or to the mobility chair seat, or to any other suitable part of the mobility chair. The straps may be mounted such that they can be extended by a mobility chair user positioned in the mobility chair seat around one or more items positioned in/on the user's lap or positioned on the seat in front of the user. The one or more straps may be fully accessible to a mobility chair user, when positioned on the mobility chair seat, in both the retracted and extended positions of the straps.

FIGS. 1 to 7 illustrate one embodiment of mobility chair 1 including an item retention system, with the one or more straps shown in a retracted position. In the embodiment shown the mobility chair 1 is a manual wheelchair, with a frame 2, wheels 3 and a seat 4. The structure and function of mobility chairs is well understood and need not be discussed in detail in this specification.

In general, the frame may be any suitable structure that supports the wheels 3 and seat 4. The frame may be formed as a frame of tubular elements (as shown in FIGS. 1 to 7), may be a moulded or otherwise shaped structure, or may be formed in any other suitable manner. The frame may be formed of any suitable metal or plastics material, or any other suitable material.

Optionally, the mobility chair 1 may include a backrest 5 and/or footrest 6.

The mobility chair 1 includes an item retention system. In the embodiment shown in FIGS. 1 to 7, the item retention system includes a pair of retractable straps, one mounted to each side of the seat 4.

However, in other embodiments only one retractable strap, or more than two retractable straps, may be provided.

The retention system may be mounted to the mobility chair by mounting arrangements 10, 11. The mounting arrangements may mount to the frame, seat or any other suitable point on the chair 1. In the embodiment shown, the mounting arrangements may be brackets that fit to the tubular frame.

However, other forms of bracket may be used and alternative arrangements, such as hook and loop (e.g. Velcro) mounting arrangements, may also be used. Further, various mounting arrangements may be used for attachment to different constructions of mobility chair. For example, some mobility chairs have non-tubular frame elements. Some mobility chairs use composite frames, such as carbon fibre frames. Suitable mounting arrangements may be envisaged for any mobility chair construction.

A strap housing 12 may be mounted by each mounting arrangement 10, 11. Each strap housing may include a retractable strap mechanism. In some embodiments, each strap housing includes a spool that stores the strap in a retracted position. The spool may apply a bias tending to retract the strap towards the retracted position. Each spool may be a self-locking spool, such as described below.

As shown in FIGS. 1 to 7, each strap housing 12 may be positioned generally beneath the seat 4. The retractable straps 13, 14 (which are shown retracted in FIGS. 1 to 7 and extended in FIGS. 8 to 12) are attached to respective buckle portions 15, 16. In the retracted position, each buckle portion 15, 16 may sit within a buckle retainer 17, 18. Each retractable strap 13, 14 retracts under a bias (as will be explained below) until its buckle portion 15, 16 sits against or within its respective buckle retainer 17, 18. This ensures that the each buckle portion 15, 16 sits in a predictable position within easy reach of the user when its respective strap is retracted. Further, the straps and buckle portions are out of the way of the hands of the user while they are pushing their manual wheelchair. This is important as hitting the thumbs on anything while pushing the wheelchair can be very painful for the user. The buckle retainers 17, 18 may be of a relatively slim design, and cooperate with the slim buckle portion design to allow the buckle portions to slip easily into the buckle retainers, while allowing the retractable straps to move freely through the retainers.

Figure 4:
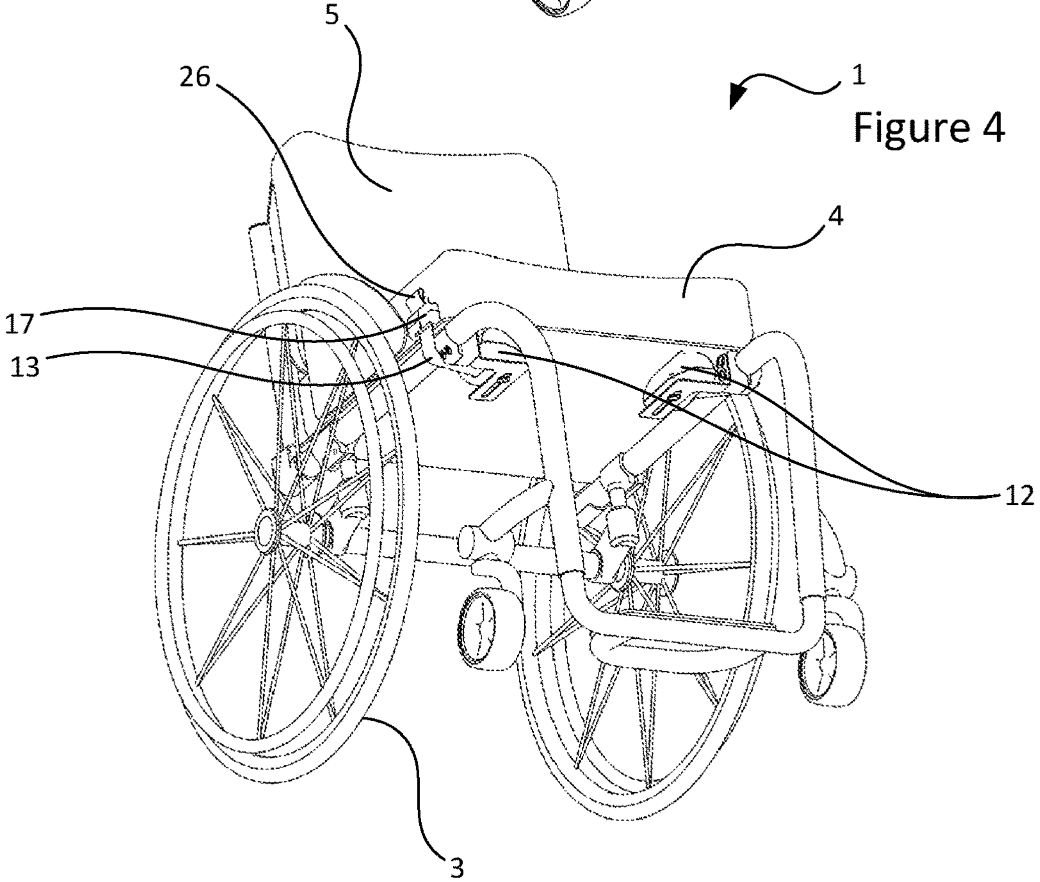
FIG. 4 is a bottom perspective view of the wheelchair of FIG. 1.
Figure 4A:
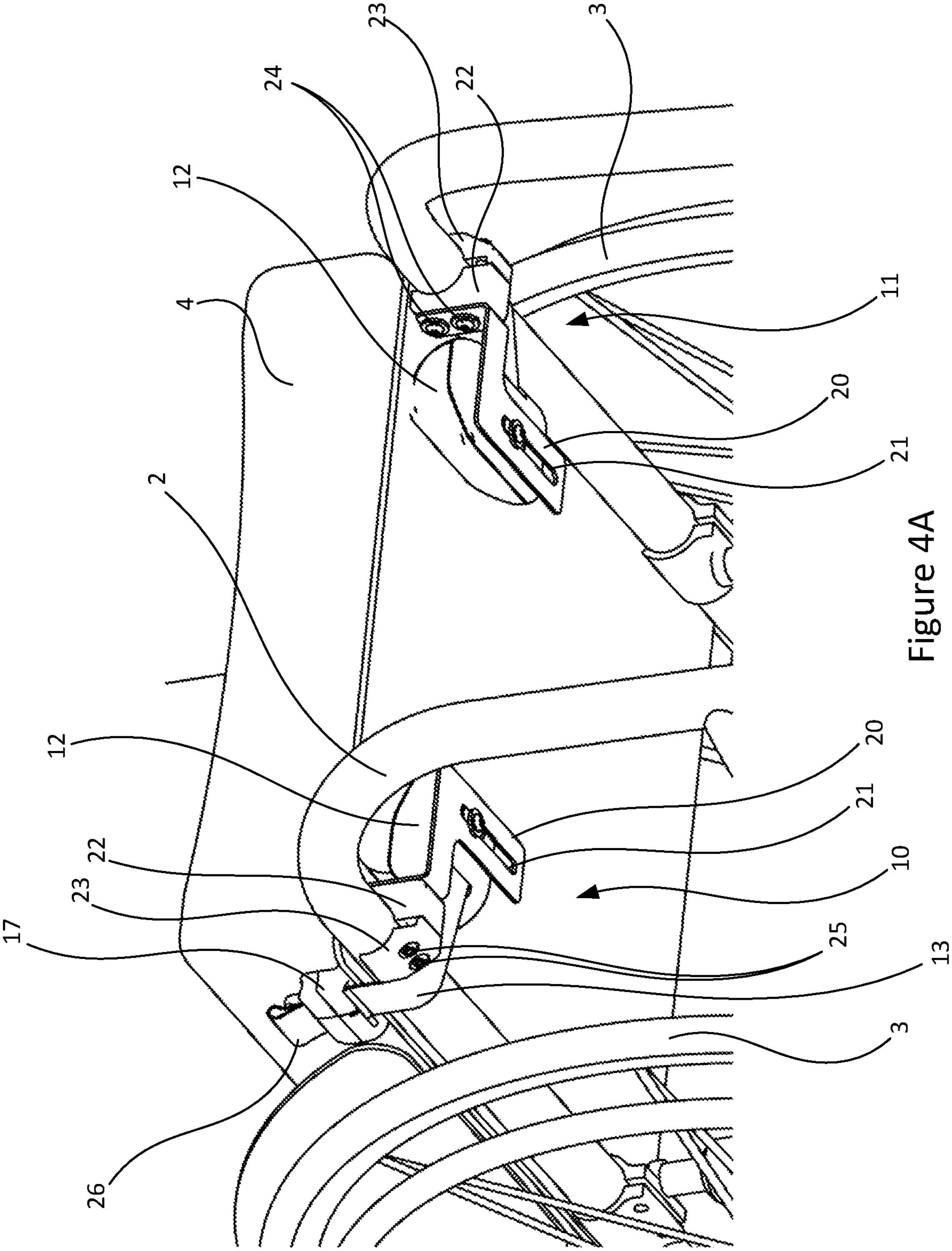
FIG. 4A is an expanded view of a part of FIG. 4.
Figure 5:
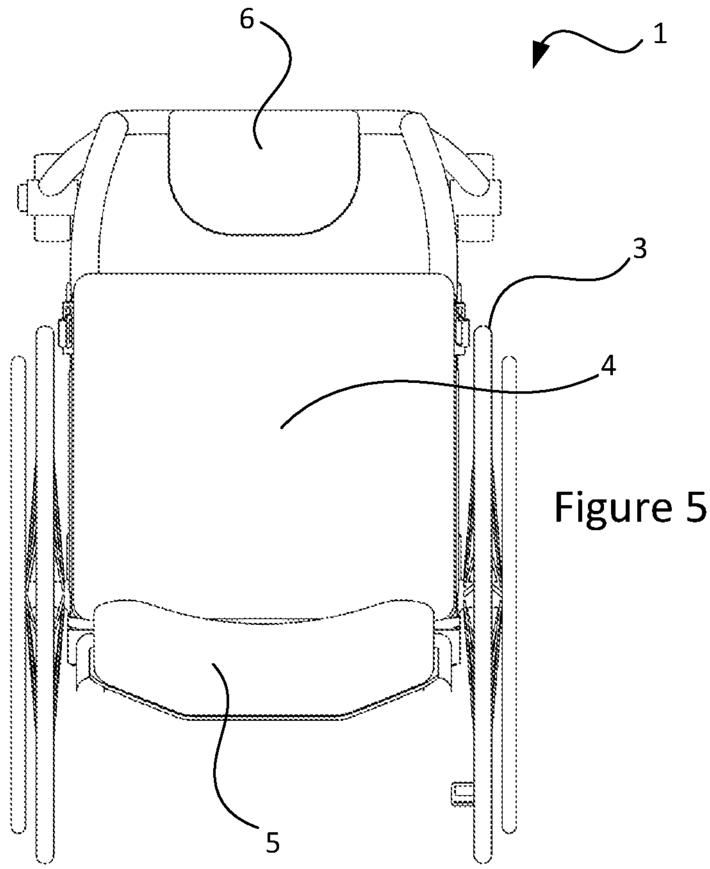
FIG. 5 is a top view of the wheelchair of FIG. 1.
Figure 6:
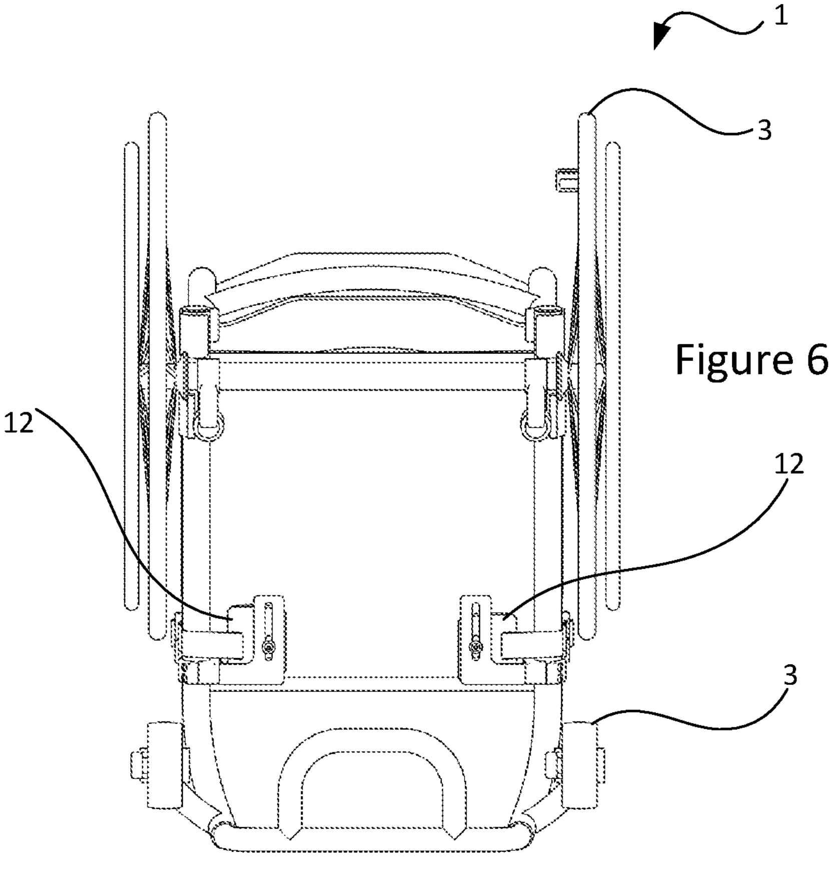
FIG. 6 is a bottom view of the wheelchair of FIG. 1.
Figure 7:
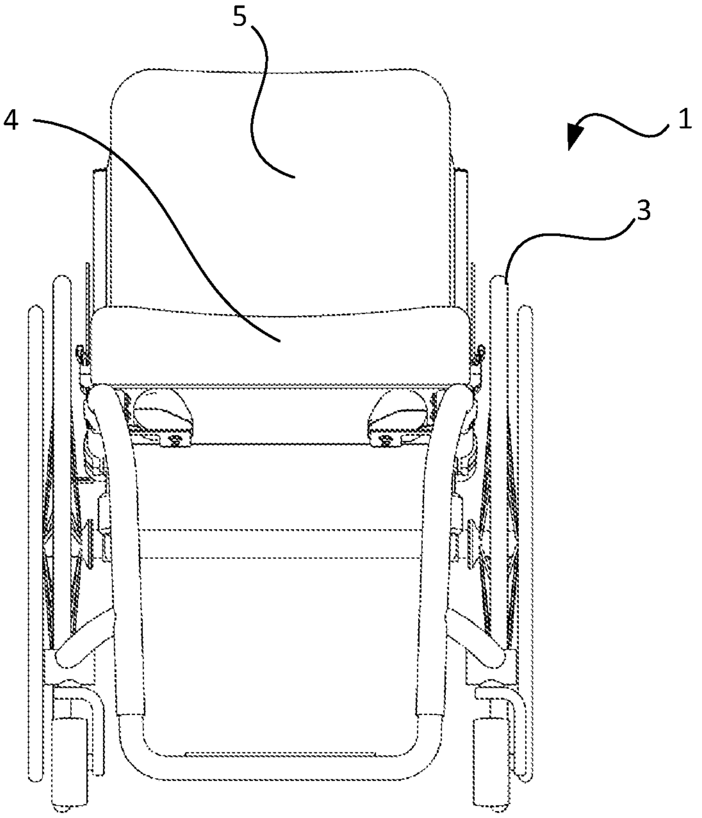
FIG. 7 is a front view of the wheelchair of FIG. 1.

FIG. 4A shows the mounting arrangement in greater detail. Each strap housing 12 is mounted by a mounting arrangement 10, 11 that includes a base plate 20 to which the housing 12 may be attached by a screw or bolt through a slot 21 in the base plate 20. The base plate 20 may be shaped such that it extends around the inside and top of the frame element to which it is attached. The buckle retainer 17 may be attached to the frame, or other suitable part of the chair, independent of the base plate 20 using any number of suitable methods including Velcro, adhesive, fasteners etc. The buckle retainer 17 should be aligned with the strap exiting the housing 12. The slot 21 in base plate 20 allows for adjustment of this alignment. In an alternative embodiment, the buckle retainer 17 may be mounted to a top portion of the base plate 20 or formed integrally with the base plate 20. The mounting arrangement may also include a bracket including inner and outer bracket parts 22, 23. The base plate and inner bracket part 22 may be attached by fasteners 24. Fasteners 25 connect the inner and outer bracket parts 22, 23 and tightening of these fasteners firmly attaches the mounting arrangement, strap housing and buckle retainer to the mobility chair frame.

The adjustable off-set arrangement of the base plate 20, with the position of the housing 12 via slot 21 allows the housing 12 to fit under the seat of the mobility chair, and allows adjustment for different mobility chairs and brake configurations.

The skilled reader will understand that various alternative arrangements for mounting the item retention system to the mobility chair may be used.

Figure 8:
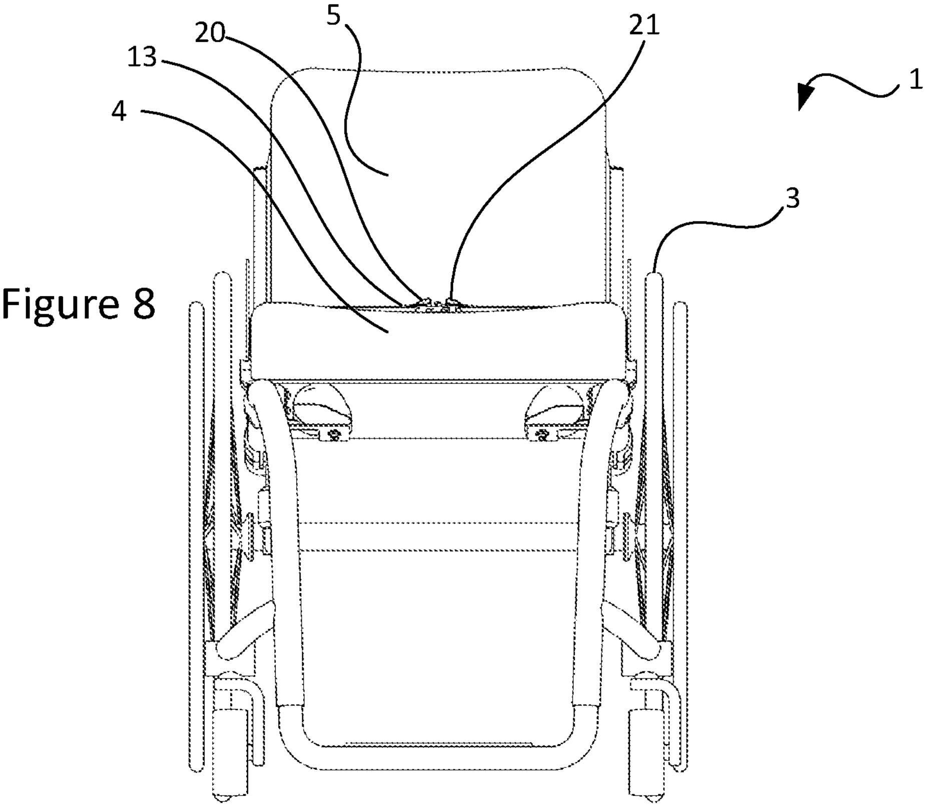
FIG. 8 is a front view of the wheelchair of FIG. 1, showing the retractable straps in an extended position.
Figure 9:
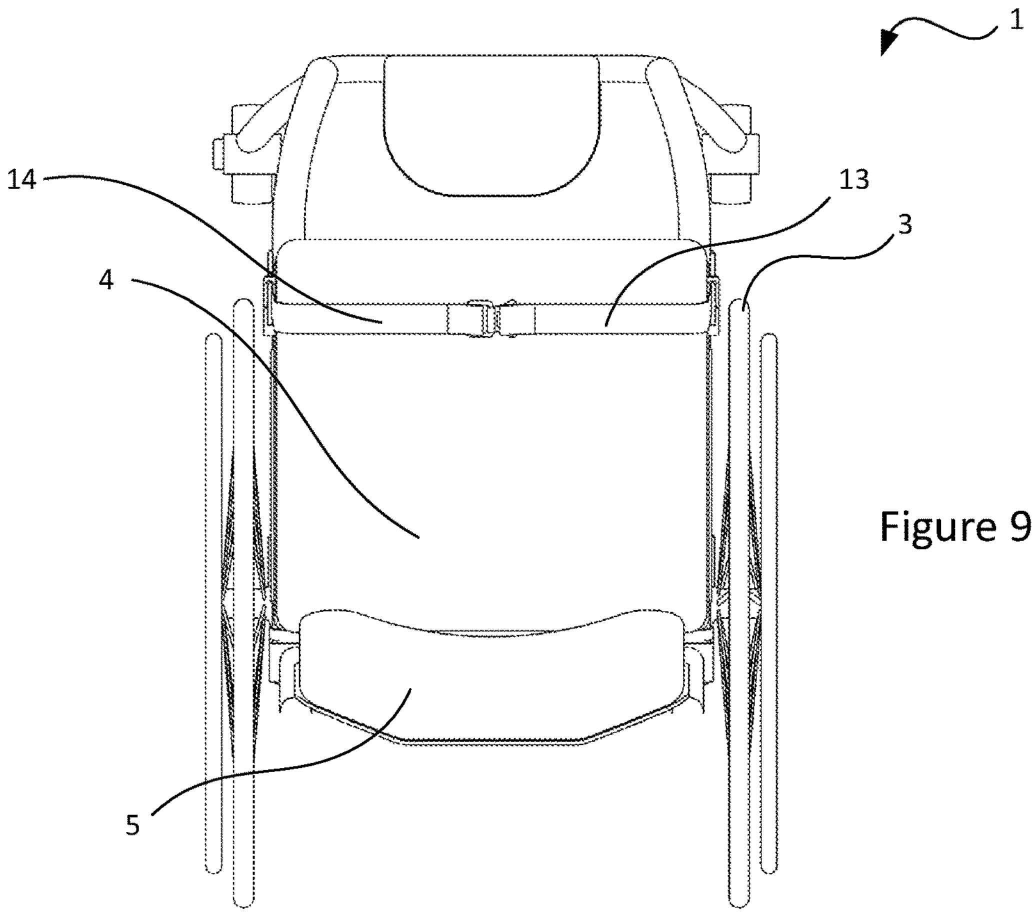
FIG. 9 is a top view of the wheelchair of FIG. 1, showing the retractable straps in an extended position.
Figure 10:
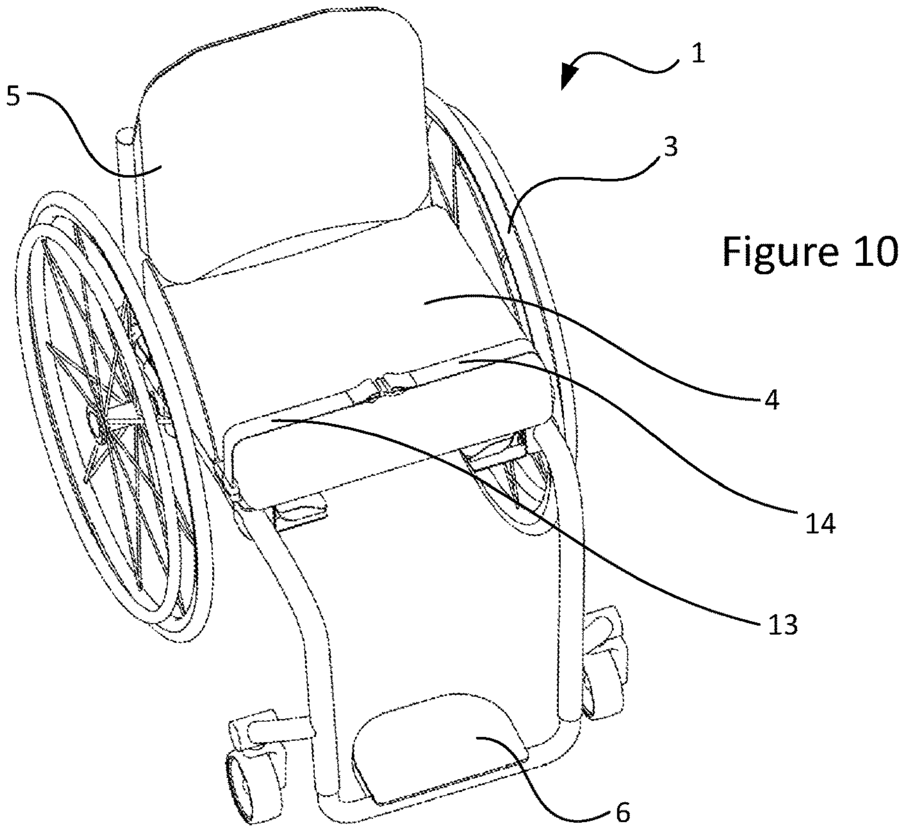
FIG. 10 is a top perspective view of the wheelchair of FIG. 1, showing the retractable straps in an extended position.

FIGS. 8 to 10 show the system of FIGS. 1 to 7, with the retractable straps extended and the buckle portions 15, 16 engaged to connect the two retractable straps 13, 14. FIGS. 11 and 12 show the buckle in greater detail. One buckle portion 16 may include an opening that receives a hook on the other buckle portion 15. This arrangement has the advantage that it sits relatively flat when buckled.

The buckle portions are also relatively slim. However, many other configurations of buckle or other connectors may be used.

In use, the straps may extend further than the position shown in FIGS. 8 to 10, allowing them to extend over or around an item to be retained.

In use, the two retractable straps 13, 14 may be pulled upwards and extended over an item placed on the lap of a seated wheelchair user. They are then locked together by a quick release buckle formed by the two buckle portions 15, 16. The self-retracting sprung mechanism then causes the connected straps to lock down on the item automatically. If more pressure on the item is required, the user can simply apply pressure down on one or both straps and the self-locking mechanism will take up the slack and lock in place. To release the straps, the user may disengage the quick release buckle and the straps will retract back into their retracted positions.

The buckles may be designed to lie relatively flat while locked together on an item. Further, a relatively slim buckle design may be used together with a buckle retainer 17, 18 in the form of a retraction socket.

The buckle portions 15, 16 then sit within the retraction socket 17, 18 in the retracted position. Thumb/finger loops, pulls or tabs 26, 27 may be attached to the buckle portions 15, 16 or to the straps 13, 14 to aid in deployment especially for those users with reduced hand function.

While the illustrated embodiment uses a buckle to secure the two extendable straps to each other, any suitable arrangement of connectors for securing one or more retractable straps in an extended position may be used. For example, hook and loop (e.g. Velcro) fasteners may be used, or a hook attached to one end of the strap may be hooked over an element of the wheelchair frame or a receiver attached to the wheelchair frame. Further in some embodiments, a single retractable strap may be used, e.g. a strap that is mounted at one side of the seat and extends to connect on the other side of the seat. In other embodiments a larger number of retractable straps may be used.

In further embodiments, elements of the system may be secured or retained by magnetic force. Cooperating magnetic elements may be used in the buckles and/or buckle retainers, for example. Elements of the system may be formed from magnetic materials and/or any suitable magnets may be mounted in or on system elements. For example, in one embodiment a magnet may be mounted in each buckle retainer and each buckle portion may be formed from a magnetic material or have a magnet mounted to it. This assists in correctly positioning and retaining of the buckle portion in the buckle retainer.

Further, as an alternative to the mechanical attachment of the two buckle portions, the buckle portions may include cooperating magnets and/or magnetic materials. In this alternative embodiment the connection of the buckle portions to each other is by magnetic force between the two buckle portions.

In a further alternative embodiment, the connection between the two buckle portions may be a hybrid mechanical/magnetic arrangement in which magnets and/or magnetic material assist in alignment and/or retention of a mechanical buckle mechanism.

Figure 13:
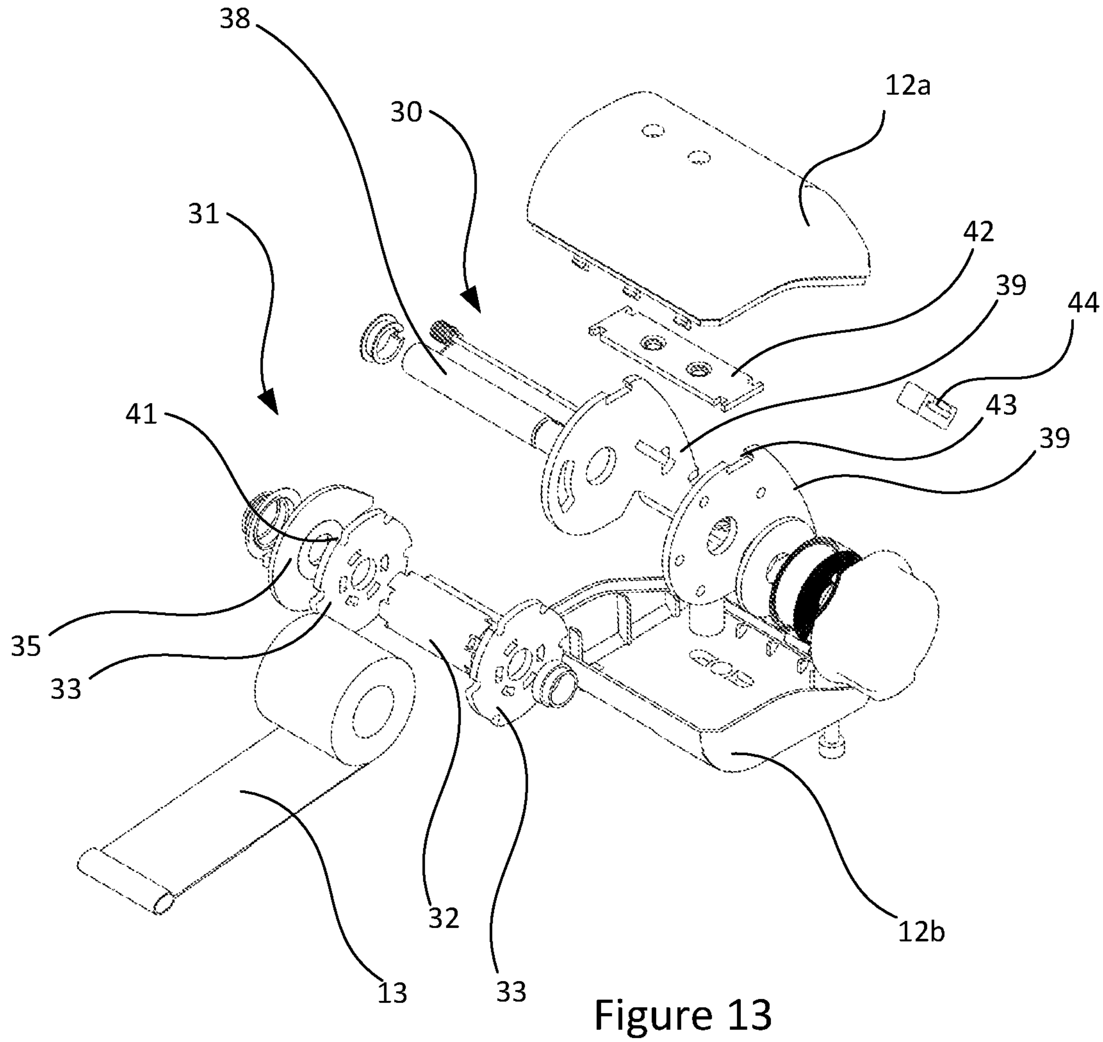
FIG. 13 is an exploded view of a strap housing and strap spool, used in the wheelchair of FIG. 1.
Figure 14:
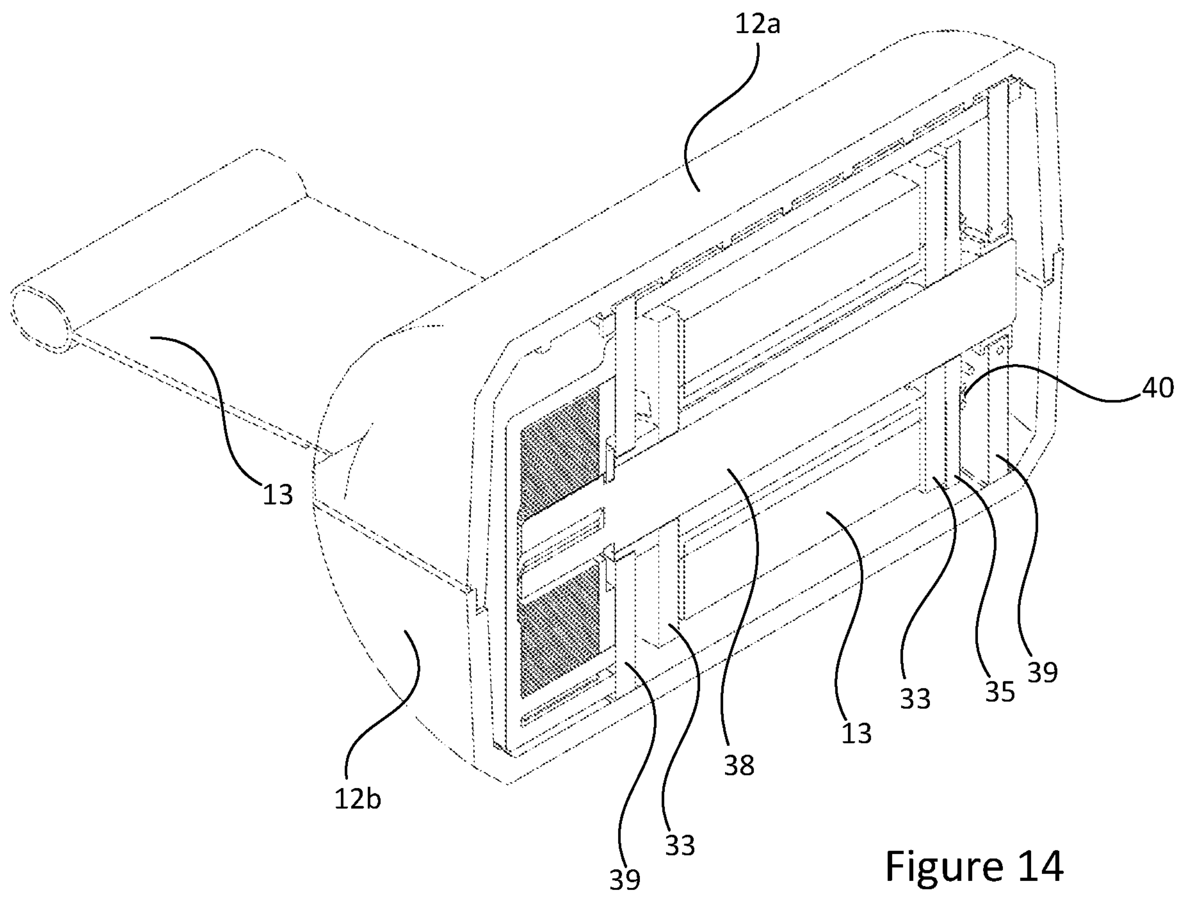
FIG. 14 is a sectional view through the strap housing and strap spool shown in FIG. 13.

FIG. 13 is an exploded view and FIG. 14 is a sectional view of the strap housing and self-locking, self-retracting strap mechanism used in the wheelchair of FIG. 1.

The skilled reader will understand that various suitable mechanisms may be used to achieve a self-retracting strap. Similarly, the skilled reader will understand that various suitable mechanisms may be used to achieve a self-retracting, self-locking strap. In some embodiments a self-retracting but non-locking strap may be considered sufficient. However, in some preferred embodiments a self-retracting and self-locking strap may be used.

In the embodiment shown, the strap housing 12 may be formed from upper and lower parts 12*a*, 12*b*. A strap 13 is wound around a self-locking and self-retracting spool located within the housing 12. The spool includes an inner axle assembly 30 and a spool assembly 31.

The spool assembly 31 includes a winding element 32 mounted between two spool flanges 33. An inner end of the strap 13 may be attached to the winding element 13 by any suitable means and the strap 13 wound around the winding element, as shown in FIG. 14. The spool assembly 31 also includes a rocker tab 35, which will be discussed further below.

The axle assembly 30 includes an axle 38 mounted between axle flanges 39.

When initially extending the retractable strap, the spool assembly 31 is free to rotate around the inner axle 38. This loads a torsion spring 40 (FIG. 14) and the spring force provided by the torsion spring 40 provides the self-retracting force tending to cause the spool to rotate in the opposite direction to wind the strap 13 back onto the spool assembly 31. The strap is therefore a self-retracting strap.

Each spool flange 33 includes a number of ratchet grooves 41 around its circumference. A member 42 hold 2 threaded inserts which allow the unit to be direct mounted if required. A locking bar can be seen along its top edge in FIG. 13, directly below arrow 30. The locking bar sits loosely within grooves 43 in the axle flanges 39 and moves between a disengaged position, in which the spool assembly is free to rotate, and an engaged position, in which the locking bar engages with the ratchet grooves. This prevents rotation of the spool assembly in a direction allowing further extension of the strap 13. In other words, in the engaged position of the locking bar (below arrow 30), further extension of the strap is prevented.

The movement of the locking bar between the engaged and disengaged positions is caused by a bias on the locking bar (below arrow 30) and the action of the rocker tab 35. In use, when the strap is initially extended, the locking bar 42 is kept in the disengaged position by a spacer tab 44 (FIG. 13) that holds the locking tab 35 away from the ratchet preventing the engagement of the locking mechanism.

The spacer tab 44 effectively determines at which point the rocker tab 35 is able to flick over and cause engagement of the locking bar (below arrow 30) with the ratchet 41 preventing any further extraction of the webbing 13, 14 from the housing 12. This spacer tab 44 prevents the ratchet from engaging too early, which would make it impossible to remove the strap from the housing. The spacer tab 44 disengages the ratchet when the strap is fully retracted and when all but a short length (e.g. around 20-50 cm, or around 40 cm) is on the spool. This allows total freedom of movement of the strap in both extending and retracting directions until a suitable length of strap has been unwound from the spool.

As the strap is unwound from the spool the effective diameter of the strap on the spool reduces. When enough strap has been pulled out of the housing a gap is created between the spacer tab 44 and the remaining webbing still held on the spool. At this point a spring holds the locking tab 35 in an open or unlocked position due to an over centre position supplemented by the force provided by the spring. When the strap is held in this position for a brief period and spool rotation is reversed the rocker tab 35 is pushed which then nudges the locking tab over centre in the opposing direction to engage the ratchet.

Thus, when the strap is buckled and tension on the strap released, the rocker tab moves to allow the locking bar to move to the engaged position. Any attempt to further extend the strap will result in the locking bar engaging with the ratchet grooves, preventing extension of the strap. In this position a user can increase tension by pulling the straps back towards the spools. The spools will wind up the excess belt and continue to prevent extension of the straps. To release the straps the user simply undoes the buckle and the straps are rewound onto the spools, with the locking bar resetting to the disengaged position.

Any suitable self-locking, self-retracting mechanism may be used, including locking retractors similar to those used in vehicle seatbelts, for example.

In further embodiments other types of retractable strap may be provided. For example, elastic retractable straps may be used. Elastic retractable straps may be configured to retract within a housing, pouch or other container. In general, the term "strap" is intended to include any belt, strip, cord, tape, or similar piece of material. The straps may be elastic or non-elastic. The straps may retract onto or into any suitable kind of holder, including spools, containers, housings, pouches etc. Other types of retractable straps may also be suitable.

Figure 15:
FIG. 15 shows a user in the wheelchair of FIG. 1, with the straps retracted.
Figure 16:
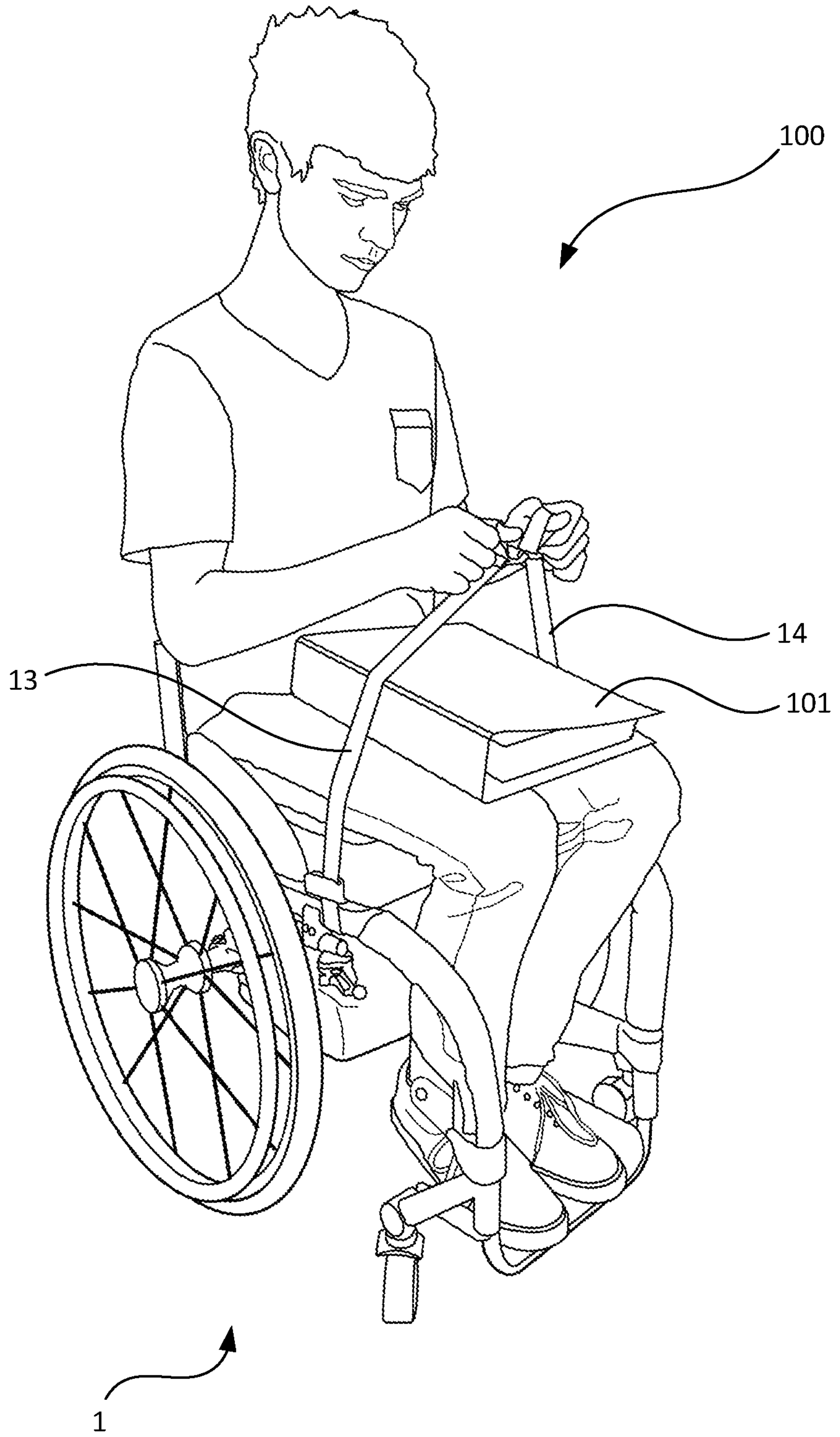
FIG. 16 shows the user and wheelchair of FIG. 15, with the user in the process of connecting the retractable straps.
Figure 17:
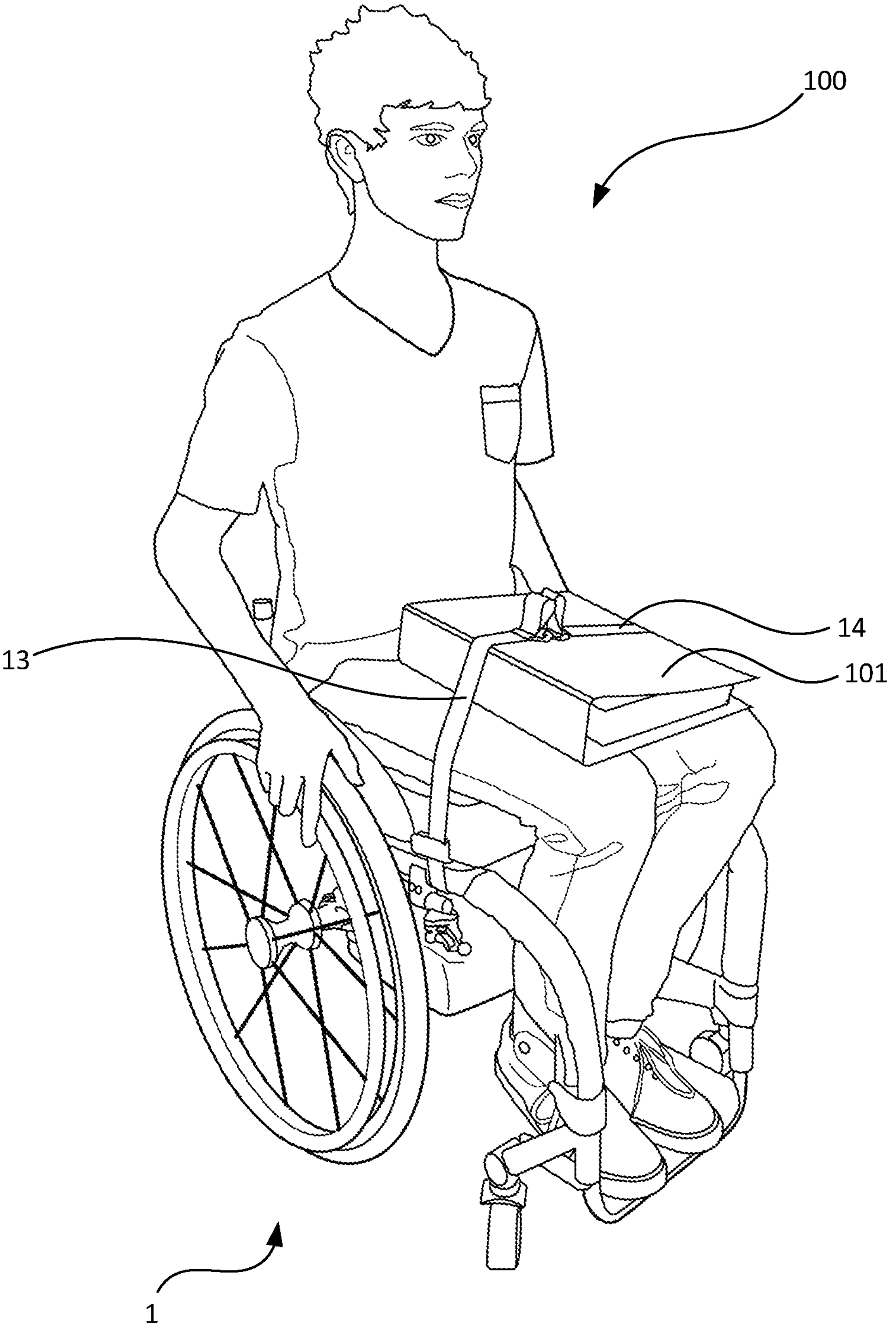
FIG. 17 shows the user and wheelchair of FIG. 15, with the straps extended, connected and locked.

FIGS. 15 to 17 show a user 100 positioned in the mobility chair 1. FIG. 15 shows the user 100 in the chair 1, with the straps retracted and no item positioned on the user's lap. FIG. 16 shows the user 100, with an item 101 positioned on the user's lap. In FIG. 16, the user has extended the straps 13, 14 and is in the process of connecting the straps 13, 14 to each other using the buckle portions, as described above. Once the user has connected the buckle portions, he or she may release the straps and the self-retracting mechanism will tighten the straps 13, 14 around the item 101. In FIG. 17, the straps 13, 14 have tightened around the item 101 and the user is free to propel the mobility chair using his or her hands while the item 101 is retained by the retention system. The user 100 may further tighten the straps around the item 101 by tensioning either or both of the straps 13, 14 and allowing the self-locking mechanism to take up the tension, as discussed above. To release the item 101, the user may disconnect the buckle portions and release the straps. The self-retracting mechanism will retract the straps back into the strap housings, with the buckles withdrawing into the buckle retainers.

The retention system may be formed from lightweight materials where possible. Mechanism weight is a concern particularly for active manual wheelchair users who must manually lift their wheelchairs in a variety of situations, for example into cars.

The Applicant's system may be fitted to new or existing mobility chairs. The clearance between the seat of the mobility chair and the wheels is maintained, with the system being clear of the moving chair parts, brakes etc. The chair can be used freely without the retention system restricting a user's movement, or the normal function of the mobility chair. The retention system may be designed to be clear of wheelchair braking systems. The mounting system may be designed to account for variances in mobility chair design such as tube dimensions (e.g. diameter, thickness, width etc), tube cross-sectional shape, other tube geometry, material, other frame constructions (e.g. composite frames), seating materials, and add-ons such as brakes and side guards. Further, the retention system may be modified for different mobility chairs while retaining the functionality described in this specification.

While the present invention has been illustrated by the description of the embodiments thereof, and while the embodiments have been described in detail, it is not the intention of the Applicant to restrict or in any way limit the scope of the appended claims to such detail. Further, the above embodiments may be implemented individually, or may be combined where compatible. Additional advantages and modifications, including combinations of the above embodiments, will readily appear to those skilled in the art. Therefore, the invention in its broader aspects is not limited to the specific details, representative apparatus and methods, and illustrative examples shown and described. Accordingly, departures may be made from such details without departure from the spirit or scope of the Applicant's general inventive concept.

What is claimed is:

1. A mobility chair comprising:

a frame, wheels and a seat; and an item retention system that comprises two retractable straps, wherein each retractable strap of said two retractable straps is in a strap housing holding said each retractable strap in a retracted position, and wherein one retractable strap of said two retractable straps and said strap housing are mounted to each side of the seat about a thigh area of a user when the user is positioned on the seat, wherein, in use, the two retractable straps are secured over the one or more items via one or more connectors arranged to secure the two retractable straps together in an extended position over the one or more items including one or more thumb or finger loops, pulls or tabs for each connector;

mounting arrangements to mount each strap housing to the frame, the seat or other point on the mobility chair, wherein said each strap housing is mounted by each mounting arrangement of said mounting arrangements; and configured such that in use, the user is positioned on the seat and the two retractable straps are arranged to be extended from the strap housing upwards from the each side of the seat and secured over one or more items positioned on a lap of the user or on the seat in front of the user so that hands of the user are free to control the mobility chair while the one or more items are retained on the lap of the user or on the seat in front of the user.

2. The mobility chair as claimed in claim 1, wherein the two retractable straps are biased to said retracted position.

3. The mobility chair as claimed in claim 1, wherein the two retractable straps are self-retracting, self-locking retractable straps.

4. The mobility chair as claimed in claim 1, wherein said each strap housing includes a strap spool onto which said each retractable strap is wound when the each retractable strap is in said retracted position, each strap spool including a self-retracting, self-locking mechanism.

5. The mobility chair as claimed in claim 1, wherein the mobility chair is a wheelchair.

6. The mobility chair as claimed in claim 1, wherein the mounting arrangements are fitted to a new or existing mobility chair.

7. The mobility chair as claimed in claim 1, wherein the mounting arrangements comprise a base plate, the base plate having an adjustable offset arrangement to allow the strap housing to fit under the seat of the mobility chair, and allows adjustment for different mobility chairs and brake configurations.

8. The mobility chair as claimed in claim 1, wherein the strap housing is positioned generally beneath the seat.

9. The mobility chair as claimed in claim 1, wherein ends of the two retractable straps comprise connectors and the two retractable straps in use are secured together via the connectors, the connectors arranged to secure the two retractable straps in an extended position over the one or more items.

10. The mobility chair as claimed in claim 9, wherein each connector of said connectors, when the each retractable strap is retracted, sits within a connector retainer, the connector retainer being attached to the mobility chair at a point independent of the strap housing.

11. The mobility chair as claimed in claim 10, wherein a position of the connector retainer on the mobility chair is aligned with the each retractable strap exiting the strap housing.

12. The mobility chair as claimed in claim 10, wherein a position of the connector retainer is located such that when the two retractable straps are retracted, each connector of the each retractable strap sits in a predictable position within easy reach of the user.

13. The mobility chair as claimed in claim 10, wherein a position of the connector retainer is located such that when the two retractable straps are retracted, the two retractable straps and the connectors are configured to be out of a way of the hands of the user while the hands of the user are pushing the mobility chair.

14. A method of retaining an item positioned on a lap of a user of a mobility chair including a frame, wheels and a seat, using an item retention system that is mounted to the mobility chair, the item retention system including two retractable straps, wherein each retractable strap of said two retractable straps is in a strap housing holding said each retractable strap in a retracted position, and wherein one retractable strap of said two retractable straps and said strap housing are mounted to each side of the seat about a thigh area of the user when the user is positioned on the seat, wherein said each retractable strap comprises one or more thumb or finger loops, pulls or tabs, and the method further comprising using the one or more thumb or finger loops, pulls or tabs when extending the two retractable straps over or around the item;

mounting arrangements to mount each strap housing to the frame, the seat or other point on the mobility chair, wherein said each strap housing is mounted by each mounting arrangement of said mounting arrangements;

the method comprising:

extending the two retractable straps from the each strap housing upwards from the sides of the seat and secured over or around the item positioned on the lap of the user to retain the item on the lap of the user or on the seat in front of the user, so that hands of the user are free to control the mobility chair while the item is retained on the lap of the user or on the seat in front of the user, and, securing of the retractable straps over or around the item completed via one or more connectors arranged to secure the retractable straps in an extended position over the item.

15. The method as claimed in claim 14, wherein extending the two retractable straps includes retrieving the one or more connectors from connector retainers, wherein each connector retainer of said connector retainers retaining its respective connector within reach of the user when the each retractable strap is in said retracted position.

16. The method as claimed in claim 15, wherein the respective connector and said each connector retainer include cooperating magnetic elements.

17. The mobility chair as claimed in claim 1, wherein the one or more connectors include one or more buckles.

18. The mobility chair as claimed in claim 1, wherein the one or more connectors include cooperating hook and loop connectors.

19. The mobility chair as claimed in claim 1, wherein the one or more connectors include cooperating magnetic connectors.

20. The mobility chair as claimed in claim 1, including a connector retainer for each connector of the one or more connectors, the connector retainer configured to retain its respective connector within reach of the user when the each retractable strap is in said retracted position.

21. The mobility chair as claimed in claim 20, wherein the each connector and the connector retainer include cooperating magnetic elements.

22. The mobility chair as claimed in claim 14, wherein the mounting arrangements comprise a base plate, the base plate having an adjustable off set arrangement to allow the strap housing to fit under the seat of the mobility chair, and allows adjustment for different mobility chairs and brake configurations.

23. The mobility chair as claimed in claim 14, wherein each connector of said connectors, when each retractable strap is retracted, sits within a connector retainer, the connector retainer being attached to the mobility chair at a point independent of the strap housing and wherein a position of the connector retainer on the mobility chair is aligned with each retractable strap exiting the strap housing.

24. A mobility chair comprising:

a frame, wheels and a seat; and an item retention system that comprises two retractable straps, wherein each retractable strap of said two retractable straps is in a strap housing holding said each retractable strap in a retracted position, and wherein one retractable strap of said two retractable straps and said strap housing are mounted to each side of the seat about a thigh area of a user when the user is positioned on the seat, and wherein the mounting arrangements comprise a base plate, the base plate having an adjustable offset arrangement to allow the strap housing to fit under the seat of the mobility chair, and allows adjustment for different mobility chairs and brake;

mounting arrangements to mount each strap housing to the frame, the seat or other point on the mobility chair, wherein said each strap housing is mounted by each mounting arrangement of said mounting arrangements; and configured such that in use, the user is positioned on the seat and the two retractable straps are arranged to be extended from the strap housing upwards from the each side of the seat and secured over one or more items positioned on a lap of the user or on the seat in front of the user so that hands of the user are free to control the mobility chair while the one or more items are retained on the lap of the user or on the seat in front of the user.

25. A mobility chair comprising:

a frame, wheels and a seat; and an item retention system that comprises two retractable straps, wherein each retractable strap of said two retractable straps is in a strap housing holding said each retractable strap in a retracted position, and wherein one retractable strap of said two retractable straps and said strap housing are mounted to each side of the seat about a thigh area of a user when the user is positioned on the seat, wherein ends of the two retractable straps comprise connectors and the two retractable straps in use are secured together via the connectors, the connectors arranged to secure the two retractable straps in an extended position over the one or more items, wherein each connector of said connectors, when the each retractable strap is retracted, sits within a connector retainer, the connector retainer being attached to the mobility chair at a point independent of the strap housing, and wherein a position of the connector retainer on the mobility chair is aligned with the each retractable strap exiting the strap housing;

mounting arrangements to mount each strap housing to the frame, the seat or other point on the mobility chair, wherein said each strap housing is mounted by each mounting arrangement of said mounting arrangements; and configured such that in use, the user is positioned on the seat and the two retractable straps are arranged to be extended from the strap housing upwards from the each side of the seat and secured over one or more items positioned on a lap of the user or on the seat in front of the user so that hands of the user are free to control the mobility chair while the one or more items are retained on the lap of the user or on the seat in front of the user.

* * * * *